United States Patent [19]

Nanao et al.

[11] Patent Number: 4,579,594
[45] Date of Patent: Apr. 1, 1986

[54] INORGANIC COMPOSITE MATERIAL AND PROCESS FOR PREPARING THE SAME

[75] Inventors: Tsutomu Nanao; Tamiyuki Eguchi, both of Kobe, Japan

[73] Assignee: Kanegafuchi Kagaku Kogyo Kabushiki Kaisha, Osaka, Japan

[21] Appl. No.: 600,278

[22] Filed: Apr. 13, 1984

[30] Foreign Application Priority Data

Apr. 15, 1983 [JP] Japan ................................. 58-67507
May 13, 1983 [JP] Japan ................................. 58-84792
May 13, 1983 [JP] Japan ................................. 58-84793
May 13, 1983 [JP] Japan ................................. 58-84796
May 13, 1983 [JP] Japan ................................. 58-84797

[51] Int. Cl.$^4$ ............................................. C09K 3/00
[52] U.S. Cl. ........................ 106/287.24; 106/287.17; 106/287.18; 106/287.19; 428/332
[58] Field of Search .................... 106/287.19, 287.17, 106/287.19, 287.24; 260/429.5

[56] References Cited

U.S. PATENT DOCUMENTS

| | | | |
|---|---|---|---|
| 3,002,854 | 10/1961 | Brill .................................. | 260/429.5 |
| 3,083,114 | 3/1963 | Gray .................................. | 106/287.19 |
| 3,769,254 | 10/1973 | Anderson et al. ..................... | 524/391 |
| 3,850,665 | 11/1974 | Plumat et al. ........................ | 428/432 |
| 4,485,094 | 11/1984 | Pebler et al. ........................ | 427/226 |

*Primary Examiner*—Theodore Morris
*Attorney, Agent, or Firm*—Armstrong, Nikaido, Marmelstein & Kubovcik

[57] ABSTRACT

A solution containing at least two metals comprising (a) at least one member selected from the group consisting of a metal alkoxide and an oligomer thereof, and (b) at least one member selected from the group consisting of a metal chelate and a chelating agent. By decomposing the solution, there is provided an inorganic composite material and a multilayer film which are useful as novel functional ceramic materials such as various sensors, electric conductive materials, magnetic recording materials, piezoelectric materials, dielectric materials and materials for optical devices.

13 Claims, No Drawings

INORGANIC COMPOSITE MATERIAL AND PROCESS FOR PREPARING THE SAME

BACKGROUND OF THE INVENTION

The present invention relates to a solution containing at least two metals and comprising at least two metal compounds.

An inorganic composite material in the form of a thin film or ultrafine particles (particles of not more than about 1 μm in particle size which cannot be prepared by any mechanical grinding) in which at least two metals uniformly exist in a form of oxide or nitride has excellent electromagnetic, optical and mechanical properties and is quite useful as a functional ceramic material such as an active element.

Hitherto, various inorganic composite materials have been prepared by various processes from various starting materials. In every preparation of the composite material, it should be noted that selection of starting materials almost totally governs the characteristics of the product.

As a conventional process for preparing the functional ceramic material, there is a process in which inorganic compounds are reacted with each other in solid phase. According to the process, however, a composite material exhibiting sufficient functions and having a high purity, an ultrafine particle size and a highly stoichiometric composition cannot be obtained.

The particles of the composite material can also be prepared by dissolving metal salts of inorganic acids in water, co-precipitating the metal salts with an alkali or a polycarboxylic acid, and then thermally decomposing the co-precipitate. According to the process, however, since inorganic metal salts which form active ions in water such as a metal carbonate, a metal a chloride, a metal sulfate and a metal nitrate are employed as starting materials, there are defects in that the ions still remain in the product as impurities even if the metal salts are thermally decomposed, that the particles obtained are increased in particle size because of grain growth, and that the heat treatment should be conducted at a high temperature for preparing the desired product.

In order to eliminate the above defects, a process in which a metal alkoxide is thermally decomposed directly or, if desired, after hydrolysis treatment has been proposed. According to the process, ultrafine particles can be prepared in high purity at a lower temperature than that in the above conventional process. The metal alkoxide can be purified by chemical procedures and can provide ideal ultrafine pure particles for a functional ceramic material by thermally decomposing the metal alkoxide or heating after hydrolyzing the metal alkoxide.

According to the process, however, a functional ceramic material consisting of a single compound can only be prepared. In general, for exhibiting maximum functions of a functional ceramic material, the functional ceramic material of a single compound is seldom employed, but there is employed a material of a compound doped with the other component or a material of a composite material such as a compound oxide. Though the desired composite material can be prepared by reacting two or more kinds of the ultrafine particles of the metal oxides in solid phase with heating, the particle size of the product becomes larger during the heat treatment, and sometimes the stoicheometrics of the elements in the composite material obtained are destroyed.

Another process has been proposed for preparing a compound oxide containing two or more metals. The process comprises preparing a mixture of two or more metal alkoxides or synthesizing a composite metal alkoxide containing two or more metals, and then decomposing the mixture or the composite metal alkoxide. However, the process is not practical because of the following defects. That is, a mixture system of two or more metal alkoxides is not usually stable and cannot provide a uniform compound oxide, since metal alkoxides vary in hydrolyzing ability depending on the kinds of metal and kinds of alkoxy group. Particularly in the case that a transition metal such as nickel, copper, cobalt or zinc is employed as a metal in a metal alkoxide, almost of the metal alkoxides are insoluble in an organic solvent. Therefore a mixture system of the transition metal alkoxides in an organic solvent cannot be hydrolyzed and thus cannot provide a uniform powder. In the case of employing a composite metal alkoxide, the desired compound oxide includes impurities such as an alkali and a halogen which exert bad influences on the product, and also the yield of the product is low because in difficulty of isolating the desired product. Accordingly, when metal alkoxides are only employed, combination of the metals in the compound oxide is limited.

Another attempt has been further proposed to prepare a compound oxide by controlling hydrolyzing abilities of metal alkoxides. The control may be conducted by preparing a metal alkoxide having a large number of carbon atoms to make the rate of hydrolysis low. The attempt is not also practical, however, since the control is complicated due to the variety of the properties of the metal alkoxide. Also the stability of the mixture of the metal alkoxides is not improved.

A metal alkoxide has been used for forming a metal oxide thin film other than for preparing ultrafine particles. The process avails hydrolysis of a metal alkoxide. A metal oxide thin film can be easily formed by applying a metal alkoxide to a substrate, hydrolyzing with moisture in air, and thermally decomposing. The process is practically adapted to a film of tetraethyl silicate for an electrically insulating film, a passivation film for alkali migration or anti-reflection film; a film of tetraisopropyl titanate for a heat reflective film, an optical filter or an undercoating for accelerating adhesion to an organic compound. However, from the above reasons there is no practical technique for preparing a compound oxide thin film from metal alkoxides.

A technique for preparing a thin film of an inorganic compound is an important fundamental technique in the electronic industry. As the technique, there is mainly employed a process utilizing a vacuum technique such as a vacuum deposition method or a sputtering method. Wide availability of a thin film of a compound oxide is expected in an optical device, a memory, a piezoelectric element, a sensor, and the like, and the thin film is partially practised. However, the adaptation of the vacuum technology for the thin film is limited because of an expensive equipment cost, a high utility, difficulty of preparation of a large film, difficulty of preparation of a film made of an oxide having a high melting point, and a low productivity. Further, it is difficult to prepare the desired product having good stoichiometry and crystallinity, because the vapor pressures of the metals are different and some metals having various valencies produce various compound oxides.

On the other hand, the process for preparing a metal oxide using a metal alkoxide has advantages in that a simple and nonexpensive equipment can be employed, that a large film can be prepared, that a cheap product can provided because of high productivity, and that a uniform film having an excellent stoichiometric property can be prepared. Therefore, if a process in which various compound oxides can be prepared by using metal alkoxides is practised, it is clear that various new uses and new functions of the compound oxides will be found.

For instance, a novel multilayer film having various functions can be prepared by laminating two or more compound oxide films.

Another adaptation is expected as a functional ceramic material in the electronic devices such as a thermistor, a varistor, a resistor, a capacitor, a filter, a magnetic core and a sensor. Such devices exhibit their functions by utilizing the specific phenomena in the interface and on the surfaces of the ceramic particles as well as the inherent properties of the functional ceramics. For instance, there is a varistor which is produced by placing bismuth oxide in the interface of electrically conductive zinc oxide particles, and a boundary layer capacitor having a high dielectric constant prepared by diffusing an acceptor ion such as bismuth ion, copper ion or manganese iron in the interfaces of a semiconductive ceramic device made of barium titanate, titanium oxide, strontium titanate, and the like. In order to prepare such electronic elements, it is important that the ceramic particles have an even particle size and that the boundary layer is thin and uniform as much as possible. Those conditions are also required to produce a compact and thin electronic element used in an integrated circuit which operates under a low voltage and a low energy. However, the above electronic devices and elements are rarely produced or are produced by complicated processes.

Furthermore, there has been proposed an attempt in which a novel functional element is prepared by uniformly dispersing ultrafine particles having functions in itself into the other ceramic material. For instance, if ultrafine magnetic particles are uniformly dispersed in a supporting material, an excellent magnetic recording material having a high density may be provided. Also there is a possibility that the functional element provides a sensor having a new function.

However, according to the conventional processes such as a powder molding process, it is very difficult to produce a ceramic material which includes two or more metals because the ultrafine particles undergo secondary agglomeration due to their large surface energy. Accordingly, even if the ultrafine particles of a metal oxide are prepared by thermally decomposing a metal alkoxide, it is hard to disperse the ultrafine particles uniformly in the other ceramic material.

SUMMARY OF THE INVENTION

The present invention relates to a solution containing at least two metals comprising (a) at least one member selected from the group consisting of a metal alkoxide and an oligomer thereof, and (b) at least one member selected from the group consisting of a metal chelate and a chelating agent. By decomposing the solution there is provided an inorganic composite material such as a compound oxide in a form of ultrafine particles, thin film or multilayer film. The inorganic composite material is useful as various sensor, electrically conductive materials, magnetic recording materials, piezoelectric materials, dielectric materials, materials for optical devices, and the like.

DETAILED DESCRIPTION

As the metal alkoxide, a metal alkoxide capable of forming a solution with a metal chelate and/or a chelating agent can be employed. Examples of the metal alkoxide are, for instance, metal alkoxides having single component, partial metal alkoxides and compound metal alkoxides represented by the formulas: $M^1(OR^1)n$, $M^1(OR^2)_a(OR^3)_b$, $M^1(X)_a(OR^1)_b$ and $M^1[N(OR^1)_m]_n$, and oligomers thereof. In the formulas, $M^1$ and N are the same or different metals, and each is lithium, sodium, potassium, rubidium, cesium, beryllium, magnesium, calcium, strontium, barium, titanium, zirconium, hafnium, vanadium, niobium, tantalum, chromium, molybdenum, tungsten, manganese, iron, nickel, cobalt, copper, zinc, cadomium, mercury, boron, aluminium, gallium, indium, thallium, silicon, germanium, tin, lead, arsemic, antimony, bismuth, yttrium, selenium, tellurium, a metal of lanthanoids, or the like. $R^1$, $R^2$ and $R^3$ are the same or different, and each is a functional group. The preferable functional organic group is an alkyl group, an aryl group, an alkenyl group, an aralkyl group, or a hydroxylated derivative or a halogenated derivative thereof having 1 to 20 carbon atoms, particularly 1 to 8 carbon atoms. Also in the formulas, n and m represent the valencies of the metals $M^1$ and $N^1$ respectively, and a and b represent positive integers and the sum of a and b is the valency of the metal $M^1$. X represents oxygen atom, nitrogen atom, a halogen atom or an organic functional group such as a carboxylic acid residue or a diketone residue having 1 to 20 carbon atoms.

Examples of the metal $M^1$ which readily forms a metal alkoxide and is cheap are, for instance, aluminium, gallium, yttrium, indium, silicon, titanium, germanium, zirconium, tin, vanadium, niobium, antimony, tantalum, bismuth, chromium, molybdenum, tungesten, manganese, iron, and the like, more preferably iron, titanium, zirconium, silicon and aluminium.

A typical compound which reacts with the metal $M^1$ to form the metal alkoxide is a monohydric or polyhydric alcohol having at least one alcoholic hydroxyl group represented by the formula HOR, wherein R is $R^1$, $R^2$ or $R^3$ defined above. Preferable examples of the alcohol are, for instance, methyl alcohol, ethyl alcohol, n-propyl alcohol, isopropyl alcohol, n-butyl alcohol, isobutyl alcohol, pentyl alcohol, hexyl alcohol, 2-ethylhexyl alcohol, octyl alcohol, tert-butyl alcohol, lauryl alcohol, 1,4-butanediol, glycerol, ethylene glycol, octylene glycol, ethylene glycol monoalkyl ether, and the like.

In the present invention, other metal alkoxides can be employed. Examples of the other metal alkoxide are metal alkoxides described in D. C. Bradley et al., "Metal alkoxides", Academic Press (1978).

The metal alkoxide employed in the present invention preferably has a proper hydrolyzing ability and stability. Those properties are defined by the kinds of metal and alcohol which are reacted. In general the larger the number of carbon atoms of the alcohol becomes, the slower the rate of hydrolysis. When an alkali metal or an alkali earth metal is employed as the metal $M^1$, the rate of hydrolysis becomes fast. Therefore, it is important to select a metal and an alcohol to be used depending on the desired rate of hydrolysis and the desired stability.

As the chelating agent in the present invention, a compound which contains oxygen atom, nitrogen atom, sulphur atom, and the like can be employed so far as it dissolves in a mixture system of the metal alkoxides. Preferable chelating agents are a carboxylic acid, a nitrogen-containing carboxylic acid, a nitrogen-containing alcohol, a nitrogen-containing thiol, a ketone, an ester, a mercaptan and a mixture thereof, particularly a ketone, an ester, a carboxylic acid and a mixture thereof.

Examples of the nitrogen-containing carboxylic acid are, for instance, EDTA (ethylenediaminetetraacetic acid), NTA (nitrilotriacetic acid), UDA(uramil diacetic acid), glycine, and the like. Examples of the nitrogen-containing alcohol are, for instance, dimethylglyoxime, oxime, and the like. Examples of the nitrogen-containing thiol are, for instance, dithiozone, and the like. Examples of the ester are, for instance, methyl acetoacetate, ethyl acetoacetate, and the like. Examples of the mercaptan are, for instance, n-butylmercaptan, octylmercaptan, dodecylmercaptan, and the like.

As the ketone, a ketone having at least two carbonyl groups is preferably employed. Preferable examples of the ketone are β-diketones represented by the formula:

$$R^4COCHR^5COR^6$$

wherein $R^4$ and $R^5$ are the same or different and each is an alkyl group, an aryl group, an aralkyl group, an alkenyl group, or a halogenated derivative or a sulfide derivative thereof, preferably having 1 to 20 carbon atoms, $R^6$ is hydrogen, $R^4$ or $R^5$. A triketone and a polyketone can also be employed.

Typical examples of the β-diketone are, for instance, acetylacetone, benzoylacetone, dibenzoylacetone, diisobutyrylmethane, dipivaloymethane, 3-methylpentane-2-dione, 2,2-dimethylpentane-3,5-dione, and a fluoride derivative thereof, particularly acetylacetone. Typical examples of the triketone are, for instance, acetoacetylacetone, and the like.

The carboxylic acid may have one or more carboxyl groups and may be saturated or unsaturated. Examples of the monocarboxylic acid are, for instance, acetic acid, linolenic acid, linoleic acid, oleic acid, octylic acid, oleostearic acid, ricinoleic acid, and the like, and examples of the polycarboxylic acid are, for instance, oxalic acid, citraconic acid, maleic acid, phthalic acid, naphthanic acid, and the like. Particularly, the unsaturated carboxylic acids such as oleic acid, linoleic acid, linolenic acid, oleostearic acid and ricinoleic acid are preferably employed.

As the metal chelate in the present invention, a metal chelate prepared from the above-mentioned chelating agent and a metal are employed. Examples of the metal are, for instance, aluminium, barium, beryllium, calcium, cadmium, cobalt, chromium, copper, iron, gallium, hafnium, mercury, indium, iridium, potassium, lithium, magnesium, manganese, molybdenum, sodium, nickel, lead, platinum, palladium, rhodium, luthenium, scandium, silicon, tin, strontium, thorium, titanium, thallium, tungsten, uranium, vanadium, yttrium, zinc, zirconium, a metal of lanthanoids, and the like. A metal chelate described in R. C. Mehrotra et al. "Metal β-Diketones and Allied Derivatives", Academic Press (1978) can be also employed.

In the present invention, as the component (a) or (b) a reaction product of the metal alkoxide and the metal chelate or the chelating agent can also be employed so far as the reaction product can form a uniform solution.

In addition, the components (a) and (b) may be partially hydrolyzed to form an oligomer, or may be in a form of colloid.

The solution of the present invention can be prepared without any solvent if the components (a) and (b) are compatible with each other. If the components (a) and (b) are not compatible, a co-solvent is required.

Preferable co-solvents in the present invention are, for instance, organic solvents having 1 to 20 carbon atoms. Examples of the organic solvents are, for instance, a monohydric alcohol such as ethyl alcohol, n-propyl alcohol, isopropyl alcohol, n-butyl alcohol, tert-butyl alcohol; a polyhydric alcohol such as glycerol, ethylene glycol, ethylene glycol monoalkyl ether; a carboxylic acid ester such as ethyl acetate, isopropyl acetate, butyl acetate, ethyl n-butyrate, iso amyl formate; an ether such as dioxane or tetrahydrofuran; a ketone such as acetone, methyl ethyl ketone, acetylacetone, diethyl ketone; an aliphatic hydrocarbon such as n-pentane, n-hexane; an aromatic hydrocarbon such as benzene, toluene or xylene; a nitrogen-containing organic solvent such as N-methyl-2-pyrrolidone, dimethylformamide, dimethylacetamide or pyridine; and a mixture thereof. Among them the monohydric alcohol, the polyhydric alcohol, the carboxylic acid lower alkyl ester, the ether and the nitrogen-containing organic solvent can be widely used. However, the solvent to be practically used should be selected depending on the combination of the components (a) and (b). The order of dissolution of the components is not particularly limited.

In the solution of the present invention, various combination of the components (a) and (b) can be employed. For instance, the solution may comprise at least one metal alkoxide and at least one metal chelate, or may comprise at least two metal alkoxides and at least one chelating agent.

In the former case, the metal chelate and the metal alkoxide which are hardly soluble in an organic solvent can be readily dissolved to form a uniform solution. Furthermore, though many metal chelates easily undergo sublimation when subjected to heating, thus lowering the yields of the oxides, the existence of the metal alkoxide can inhibit the sublimation of the metal chelate, which makes the yield of the product high. In addition, ultrafine particles and a thin film of the compound oxide can be prepared by a lower temperature than that in the conventional process.

The reason for the above phenomena is not clear, but is assumed that, since both of the metal alkoxide and the metal chelate are reactive and can form various complexes, they are not individually dissolved, but are dissolved by preparing a new compound by means of coordination or complexing. As a result, the solubilities of the metal chelate and the metal alkoxide are improved and the sublimation of the metal chelate can be inhibited.

In the latter case, i.e. the combination of the metal alkoxides and the chelating agent, the chelating agent can easily react with the metal alkoxides to form a metal chelate or a metal alkoxide which is partially chelated. In the reaction, the unstable metal alkoxide and the metal alkoxide having a high rate of hydrolysis are preferentially reacted with the chelating agent to form a stable compound. According to the present invention, the transition metal alkoxide which is hardly dissolved in an organic solvent can form a uniform solution with the chelating agent. Furthermore, the uniform solution can be easily and constantly hydrolyzed and the desired ultrafine particles and thin film of the compound oxide can be readily prepared in the same manner as in the process using single metal alkoxide.

The reason for obtaining such effects is not clear, but it is assumed that the chelating agent averages the solubilities and the hydrolyzing abilities of the metal alkoxides, and forms to some extent coordination bonds or chelating portion between the metals.

Even if the metal alkoxide and/or the metal chelate are insoluble or hardly soluble in the organic solvent, it is possible to dissolve them uniformly by adding an aldehyde and, if necessary, heating the mixture. On the other hand, when using a large amount of the chelating agent or a chelating agent which has a high chelating ability, a precipitate is formed from the mixture of the chelating agent and two or more metal alkoxides. In such case, the precipitate can also be dissolved by adding an aldehyde and, if necessary, heating. The heat treatment is preferably carried out at a temperature of not more than the refluxing temperature of the solvent. The above effect is remarkable when the chelating agent is a $\beta$-diketone. Furthermore, the addition of the aldehyde can inhibit the sublimation of the metal chelate.

Preferable aldehydes are aldehydes having 1 to 8 carbon atoms. Typical examples of the aldehyde are, for instance, formaldehyde, paraformaldehydse, acetaldehyde, benzaldehyde, and the like.

The excellent solubilizing effect by the addition of the aldehyde can be obtained when the metal or the metals of the components (a) and/or (b) are metals of Group I or II of the Periodic Table.

The excellent inhibition effect of the sublimation can be obtained when the metal chelate is stable or the metal of the metal alkoxide is a transition metal having 3 to 5 valencies.

The amount of the aldehyde to be added is in general not less than 0.001 mole, usually not less than 0.1 mole on the basis of 1 mole of the total metals the components (a) and (b) used.

The reason for obtaining the above effects of the solubilization and the inhibition of sublimation is not clear, but it is assumed that the aldehyde reacts with the components (a) and (b) to improve the solubility of the metal alkoxide and/or the metal chelate and to inhibit the sublimation at the heat treatment.

The amounts of the components (a) and (b) are selected depending on the solubilities of the components to the solvent and to each other, and the desired composition of the composite material. In general, in the case of employing the metal chelate as the component (b), the molar ratio of the metal $M^2$ of the metal chelate/ the metal $M^1$ of the metal alkoxide is not less than 0.001, preferably the number of moles of the metal $M^1$ $\leq 1.5 \times$ the number of moles of the metal $M^2$. For doping a slight amount of a dopant, the amount of the metal alkoxide or the metal chelate containing the metal to be doped may be quite little.

In the case of employing the chelating agent as the component (b), the chelating agent should be added so that the number of functional groups of the chelating agent is not more than the total number of alkoxy groups of the metal alkoxides, in order to avoid damage of the inherent properties of the metal alkoxides. The atomic ratio of the metals of the different metal alkoxides are selected depending on the desired composition of the composite material.

In the present invention, the metal alkoxide and the metal chelate may include two or more kinds of metals, or may include the same metal. Also, the solution of the present invention may comprise three or more metal-containing components.

In addition, additives other than the solvent may be added to the solution. Examples of the additive are, for example, an organic acid for accelerating the thermal decomposition, an antioxidant for improving the pot life, a viscosity controller for controlling the thickness of the film at the preparation stage of the film, such as a cellulose polymer, polyvinyl acetate, glycerol or polyethylene glycol, and an organic metal compound such as a metal organic acid for supplementing a metal component. It should be noted that the additives must be dissolved in the co-solvent and must exert no bad influence on the preparation of the ultrafine particles and the thin film of the composite material. Particularly, for preparing the thin film, a polymer material soluble in the co-solvent such as polyvinyl alcohol, nitrocellulose, polyvinylbutyral, an acrylic acid, polymer, cellulose or a starch may be added. Furthermore, an agent for accelerating the processing such as a plasticizer or a stabilizer may be added and also a small amount of an inorganic salt such as a chloride or a nitrate may be added for controlling the grain growth during calcining.

Ultrafine particles and a thin film of the composite material containing the desired metals can be readily prepared by heating the solution of the present invention, because the solution has an excellent stability and can be hydrolyzed as easily as the solution of the metal alkoxide alone.

The composition of the composite material can be optionally varied by selecting the combination of the components (a) and (b). Particularly there are advantages for preparing a composite material containing a transition metal which cannot be prepared from the use of metal alkoxide alone, an alkali metal or an alkaline earth metal which cannot form a stable metal alkoxide, and a metal which cannot form a metal alkoxide. Also the present invention is suitable to prepare a composite material uniformly containing a trace amount of a metal component.

The composite material can be prepared by thermally decomposing the components (a) and (b) in the solution of the present invention with heating.

According to the present invention, the composition of the composite material can be varied by selecting an atmosphere in the heat treatment. For instance, a compound oxide and a mixture of metal oxides can be prepared by heating in air, a composite metal or an alloy can be prepared by heating in a reducing atmosphere such as an atmosphere containing hydrogen, carbon monoxide, or the like, and a composite material containing a nitride can be prepared by heating in an atmosphere containing $NH_3$ or $N_2$.

As the process for preparing the ultrafine particles of the composite material, there are employed a process in which the solution is heated as it is and thermally decomposed; a process in which the solution is heated and thermally decomposed after hydrolyzing the solution by adding a small amount of water or an aqueous ammonia; a process in which the gas or mist of the solution is heated and thermally decomposed; and a process in which the solution is gasified and decomposed by means of a laser beam or a plasma. The ultrafine particles obtained by thermally decomposing the gaseous solution or by decomposing by means of the plasma or the laser beam have an excellent dispersibility. In general, the higher the rate of the thermal decomposition becomes, the finer the particle size of the product and the better the stoichiometry of the product.

As the process for preparing the thin film, there are employed a process in which the solution is applied to a substrate by spraying, dip coating or spin coating, and then heated and thermally decomposed; a process in which the solution is sprayed to a substrate which is heated at a thermal decomposition temperature; a process in which the decomposition product of the solution is accumulated on a substrate while the gasified solution is thermally decomposed or decomposed by means of the plasma, and the like; a process in which the film formed is further baked; a printing process; and the like, those processes being employed in case of using a metal alkoxide alone. The application process and the spraying process are preferably employed because of its high productivity with inexpensive equipments.

In the case of preparing the thin film by the application process, a good thin film can be usually obtained when the metal content is adjusted to 0.01 to 20% (% by weight, hereinafter the same), preferably 0.1 to 10%, and the heat treatment is carried out at a temperature of not less than 200° C. When the metal content is less than 0.01% the applied solution is sometimes uneven because the solution applied is repelled on the surface of the substrate. On the other hand, when the metal content is more than 20% the thickness of the coated film at one coating becomes thick, so that cracks are sometimes formed due to thermal distortion or generation of decomposition gas, or the surface of the coated film is at first thermally decomposed to form particles which make the film obtained muddy. However, since such conditions greatly vary depending on the combination of the components (a) and (b), the kind of co-solvent, the kind of application method, the atmosphere in the application, and the like, it should be noted that the optimum conditions are selected in consideration of the above factors.

In case of employing the dip coating method, a thin film having an excellent evenness can be obtained by adjusting the withdrawing speed of a substrate to 0.5 to 100 cm/min, preferably 2 to 20 cm/min.

In the case of employing the spraying method, the solution containing the metals of 0.01 to 20%, preferably 0.05 to 5% is sprayed on a substrate which is heated at a temperature of not less than 200° C., preferably 300° C., most preferably 400° C. by using a carrier gas such as air, nitrogen gas, argon gas, herium gas, a water steam or a mixture gas thereof. When a stable metal chelate is employed a thin film having an excellent quality and stoichiometry can be obtained by using a carrier gas containing a water stream which improves the decomposition of the metal chelate. Furthermore, in order to improve the quality of the film, it is important to make the particle size of the mist of the solution fine and uniform. Preferable particle size is not more than 20 $\mu$m. For preparing such a fine mist, there are employed a process in which a nozzle and a space where the mist disperses are vibrated by applying a high frequency or a supersonic wave to prepare a uniform and fine mist, and further the mist is rapidly adhered to a substrate by applying an electric field between the nozzle and the substrate. Since the treating amount of the solution at one application and the flow rate of the carrier gas greatly vary depending on an equipment used, those conditions should be controlled accordingly.

The thickness of the film can be controlled by selecting the factors such as the metal content, the viscosity of the solution and amount of coated solution. Preferable thickness of the film obtained by one coating procedure is not more than 1 $\mu$m. In the dip coating method, the thickness of the coated film at one coating is generally 100 to 3000 Å, preferably 100 to 1500 Å. In the spraying method the thickness of the coated film is preferably not more than 3000 Å at one coating. When the thickness of the coated film is more than 3000 Å, the next coating procedure is preferably carried out after heating the primer coated film for removing a carbide. The coating procedure may be repeated several times with the same or different solutions to produce a multi-layer film including the same or different composite films.

For preparing the multilayer film, it is important that the next coating procedure is carried out after removing organic components from the coated film by thermal decomposition or volatilization. However, when the total thickness is thin, the heat treatment may be carried out after completion of the all coating procedures.

The multilayer film of the present invention can be prepared by carrying out the above procedure at least once, i.e. by carrying out the above procedure twice or more, or by carrying out the conventional vacuum film-forming process in addition to the procedure according to the present invention. It is necessary that the multilayer film includes at least one thin film of the composite material of the present invention having a thickness of not more than 10 $\mu$m. When the thickness of the thin film of the composite material is more than 10 $\mu$m, the desired functions may not be obtained.

According to the process for preparing the multilayer, many kinds of large multilayer films having various compositions which cannot be prepared by the conventional vacuum process can be prepared with simple equipments. Typical examples of the multilayers are, for instance, a ferroelectric film and a piezoelectric film of barium titanate or lead titanate having a perofskite structure, a ferromagnetic film of nickel ferrite or cobalt ferrite having a spinel structure, a ferromagnetic film of barium ferrite or strontium ferrite having a magnetoplumbite structure, and the like.

A dense composite film having an excellent mechanical strength can also be obtained by employing the unsaturated carboxylic acid. When the unsaturated carboxylic acid is dried after applying to a substrate, the unsaturated carboxylic acid is oxidized and cured to form a good film which is a precursor of the desired film. The precursor film is baked to give the dense film. The dry treatment is preferably carried out in an oxidizing atmosphere at a temperature of not less than 100° C. for 15 minutes or more.

By changing the conditions in the heat treatment a composite material having a different crystalline state can be prepared. In the early stage of the heat treatment, the film is in an amorphous phase and becomes crystalline as the heat treatment proceeds. Therefore, any film having the desired crystalline state can be prepared by selecting the heat condition. Such film having various crystalline states cannot be prepared by the conventional process, and is useful as a new functional ceramic material.

The amorphous phase is usually obtained at 300° to 500° C. at which the decomposition of the organic substances contained is completed. At a temperature of not less than 400° C., a crystalline material begins to form. However, the temperature of the heat treatment should be optimally selected because the temperature varies depending on the composition of the solution and the desired product.

As the substrate to which the solution is applied, any material can be employed as far as it has a resistance against the heat treatment. Examples of the substrates are, for instance, a ceramic plate made of glass, alumina, silica, and the like; a metal plate or foil made of stainless steel, and the like; a heat stable resin film made of polyimide, and the like. A preferable substrate has an excellent evenness.

According to the present invention, a thin film in which ultrafine particles of the composite material are uniformly distributed can be prepared by applying the solution to the substrate and baking. When the solution contains a polymer material, a precursor film is formed by evaporating a solvent, and then is baked to give a film. The temperature of the heat treatment is determined depending on the metal compounds and the composition of the desired product. As a process of the preparation, there can be employed any process mentioned above for preparing a thin film.

The combination of the metals is not particularly limited. For instance, when the solution is prepared by combining Zn with Bi, Co, Mn, Sb or Cr which is not reactive with Zn, a thin film of an oxide which contains two or more metal oxides can be obtained by heating under adjusted conditions, and when the solution is prepared by combining Si and Fe with Mn, Ni, Zn, Mg, Bo and Sr, a thin film of $SiO_2$ glass in which ferrite particles are uniformly dispersed.

Furthermore, when the solution is prepared by dissolving the components (a) and (b), and the solution is outside the desired stoichiometric composition, a thin film of two or more components can be obtained because the excess component in the solution is deposited. For instance, a thin film comprising nickel ferrite particles between which nickel oxide is uniformly dispersed can be prepared from a solution containing Ni in excess amount of the stoichiometric ratio of nickel ferrite ($NiFe_2O_4$).

Each particle in the thin film of the present invention is very fine in particle size and is uniformly distributed or dispersed because the film is prepared by thermally decomposing the organic metal compounds, which is essentially different from the conventional process such as the powder molding process. Therefore, the contact surface with each component is very large, which can provide a new function.

The uniform distribution of the ceramic particles can be observed with a scanning type microscope. According to the present invention, the difference of the atomic ratios of the two or more metals in 10 $\mu m$ square of various specimens of the films is within not more than 20%. The thickness of the thin film is not more than 200 $\mu m$, preferably not more than 50 $\mu m$.

The composite material of the present invention is very useful as a functional ceramic material such as a sensor, an electric conductive material, a magnetic recording material, a piezoelectric material, a dielectric material and a material for an optical device. Particularly the multilayer film of the present invention can be used as a transparent electric conductive film mainly made of tin oxide or indium oxide on a transparent substrate such as a glass plate; a film of $PbTiO_3$ or $(Pb_x.La_{1-x})(Ti_y.Zr_{1-y})O_3$; an optical memory which is produced by laminating the transparent electric conductive films; an electrical polarizer; a layered capacitor which is produced by laminating an electric conductive film and a ferroelectric film made of barium titanate alternately; a magnetic recording material which is produced by laminating a soft magnetic film such as $(Ni_x.Zr_{1-x}).Fe_2O_4$ and a film of $CoFe_2O_4$ or $BeO.6$-$Fe_2O_3$; a material for an optical device, a sensor, a filter; and the like.

The present invention is more particularly described and explained by means of the following Examples. It is to be understood that the present invention is not limited to the Examples and various changes and modifications may be made in the invention without departing from the spirit and scope thereof.

EXAMPLES 1 TO 4

In 100 g of dry ethyl alcohol was dissolved 20.0 g of iron triisopropoxide, and the metal acetylacetonate shown in Table 1 was added to the solution in an amount so as to give a spinel ferrite composition (Fe: other metal=2:1). The metal acetylacetone was smoothly dissolved in the solution to give a composite solution of the metal compounds.

The solution obtained was divided to two parts, and then the one part thereof was hydrolyzed with a small amount of water and the other part was not hydrolyzed. Each part was calcined in air by means of a far infrared ray furnace by elevating a temperature to 800° C. at a rate of 20° C./min to give a compound oxide. In the compound oxide there was left about 99% of Fe which was contained in the solution.

The compound oxide obtained was determined in elementary ratio of Fe to the other metal by fluorescent X-ray method. The results are shown in Table 1.

TABLE 1

| Example | Metal acetylacetonate | Elementary ratio in compound oxide | |
|---|---|---|---|
| | | Non-hydrolyzed | Hydrolyzed |
| 1 | $Ni(AA)_2$ (11.03) | Fe:Ni =2:0.91 | Fe:Ni =2:0.97 |
| 2 | $Zn(AA)_2$ (11.32) | Fe:Zn =2:0.88 | Fe:Zn =2:0.90 |
| 3 | $Mn(AA)_2$ (10.95) | Fe:Mn =2:0.87 | Fe:Mn =2:0.94 |
| 4 | $Co(AA)_2$ (11.04) | Fe:Co =2:0.85 | Fe:Co =2:0.92 |

In Table 1 and the following Tables, AA represents an acetylacetonate group ($C_5H_7O_2$).

COMPARATIVE EXAMPLES 1 TO 6

The metal acetylacetonate shown in Table 2 was calcined in the same manner as in Example 1 to give the corresponding metal oxide of the amount shown in Table 2. The yield of each metal oxide is also shown in Table 2.

TABLE 2

| Comparative Example | Metal acetylacetonate | Metal oxide obtained by calcination | Amount (g) | Yield (%) |
|---|---|---|---|---|
| 1 | $Fe(AA)_3$ (1.193) | $Fe_2O_3$ | 0.190 | 72.2 |
| 2 | $Cr(AA)_3$ (1.516) | $Cr_2O_3$ | 0 | 0 |
| 3 | $Ni(AA)_2$ (1.302) | NiO | 0.256 | 68.2 |
| 4 | $Mn(AA)_2$ | MnO | 0.320 | 77.1 |

TABLE 2-continued

| Comparative Example | Metal acetylacetonate | Metal oxide obtained by calcination | Amount (g) | Yield (%) |
|---|---|---|---|---|
|  | (1.480) |  |  |  |
| 5 | Zn(AA)$_2$ | ZnO | 0.161 | 37.7 |
|  | (1.381) |  |  |  |
| 6 | Co(AA)$_2$ | Co$_3$O$_4$ | 0.260 | 53.2 |
|  | (1.679) |  |  |  |

As is clear from Table 2, the yield of the metal oxide was greatly lowered because the metal acetylacetonate was sublimed and volatilized by the heat treatment.

On the other hand, because the residual Fe in the compound oxides prepared in Examples 1 to 4 was about 99% and the elementary ratios of the metals in the oxides shown in Table 1 were close to those in the solution, the metals in the metal acetylacetonates were in greater amounts left in the compound oxides when the metal alkoxides were additionally used than in the case where the metal acetylacetonates were used alone. This result shows the fact that the sublimation of the metal acetylacetonate is inhibited by the additional use of the metal alkoxide.

EXAMPLE 5

To the ethyl alcohol solution of iron triisopropoxide and cobaltbisacetylacetonate (Fe:Co=2:1) prepared in Example 4 was added 50 g of dry ethyl alcohol solution of formaldehyde prepared by thermally decomposing 2 g of paraformaldehyde in 100 g of ethyl alcohol. The mixture obtained was refluxed and thermally decomposed in the same manner as in Example 1 to give a compound oxide (Fe:Co=2:0.95) from the non-hydrolyzed solution and a compound oxide (Fe:Co=2:0.98) from the hydrolyzed solution. As a result of comparing this result with the result in Example 4, it is seen that the yield of cobalt oxide increases by the addition of formaldehyde.

EXAMPLE 6

In a dry nitrogen gas atmosphere, 6.72 g of nickel bisacetylacetonate was added to 10 g of iron triethoxide so that the atomic ratio of Fe:Co was 2:1, and then 200 g of tetrahydrofuran was added thereto. The solution obtained was uniform and stable for one or more months. The solution was applied to glass plate made of Corning #7059 having 0.7 mm in thickness (alkalifree glass available from Corning Glass Works) by dip coating at a withdrawing speed of 10 cm/min. the coated glass was then baked in a muffle furnace by elevating the temperature to 600° C. at a rate of about 5° C./min and maintaining at 600° C. for one hour to give a yellowish brown transparent thin film of nickel ferrite of about 1500 Å in thickness.

In addition, after removing the solvent from the solution prepared in the above under reduced pressure in an alumina boat, the residue was calcined in a muffle furnace at 800° C. for one hour to give uniform and ultrafine nickel ferrite particles of about 0.1 μm in primary particle size and having a narrow particle size distribution. As a result of determining the magnetic property of the ultrafine particles with a vibrating sample magnetometer, the saturated magnetization was found to be 2400 Gauss and the coercive force was found to be 125 Oersted. The coercive force of the particles obtained in Example 6 is larger than that of a nickel ferrite prepared by a conventional process by two orders. The improvement of the coercive force results from the difference of the particle sizes.

EXAMPLE 7

To 100 g of dry ethyl alcohol was dispersed 16.79 g of barium bisacetylacetonate which is not dissolved in an organic solvent such as ethyl alcohol and benzene, and then 1 g of paraformaldehyde and 14.21 g of titanium tetraisopropoxide which contained titanium equivalent to barium in barium bisacetylacetonate were added. After heating the mixture, titanium tetraisopropoxide and barium bisacetylacetonate were smoothly dissolved to give a reddish transparent solution. The solution obtained could be sensitively reacted with water, but was stable for one or more months when it was sealed.

The solution was gradually hydrolyzed by adding dropwise ethyl alcohol containing 1% by weight of water to yield a precipitate of 50 to 200 Å in particle size. The form of the precipitate was amorphous as shown by X-ray analysis. The precipitate was calcined at 1000° C. for one hour to give an ultrafine powder of barium titanate which had a good crystallinity and a primary particle size of not more than 0.1 μm (yield 100%).

In addition, the solution obtained in the above was applied to a quartz glass in the same manner as in Example 6, and then baked at 1000° C. for one hour to give a yellowish white transparent thin film of BaTiO$_3$.

EXAMPLE 8

To 100 g of dry ethyl alcohol containing 1 g of paraformaldehyde was dispersed 2.0 g of strontium bisacetylacetonate which is not soluble in an organic solvent such as ethyl alcohol and benzene, and then 19.56 g of iron triisopropoxide which contained Fe 12 equivalents of strontium in strontium bisacetylacetonate was added. The added iron triisopropoxide and strontium bisacetylacetonate were dissolved to give a uniform solution. After hydrolyzing the solution with a small amount of water, the solution was dried up and calcined at 800° C. for two hours in a muffle furnace to give ultrafine particles of strontium ferrite which were in a form of a hexagonal plate and had a primary particle size of 0.5 μm.

In addition, the solution obtained in the above was applied to a quartz glass in the same manner as in Example 6, and then baked at 800° C. for one hour to give a red transparent thin film of SrO.6Fe$_2$O$_3$ (thickness: about 1000 Å).

EXAMPLE 9

In 100 g of dry ethyl alcohol were dissolved 5.17 g of barium diisopropoxide and 5.69 g of titanium tetraisopropoxide so that the atomic ratio of Ba:Ti was 1:1, and then 2 g of acetylacetone which was added to yield a white precipitate. The precipitate was dissolved by adding 0.3 g of paraformaldehyde (molar ratio 0.5) and refluxing for ten minutes to give a reddish brown transparent uniform solution. When the solvent was changed to tetrahydrofuran, the solution was stable for one or more months. The solution could be hydrolyzed. A transparent thin film could be prepared by dip coating to a quartz glass with the solution at a withdrawing speed of 10 cm/min. The thin film was baked at 800° C. for one hour to give a transparent thin film of BaTiO$_3$.

In addition, after removing the solvent from the solution, the residue was calcined at 600° C. for one hour to give ultrafine particles of BaTiO$_3$ which had not more than 0.1 μm in particle size. From the hydrolyzed solution, the simular ultrafine particles of BaTiO$_3$ were obtained.

EXAMPLE 10

In 100 g of dry ethyl alcohol were dissolved 15 g of iron triethoxide and 1.35 g of strontium diisopropoxide so that the atomic ratio of Fe:Sr was 12:1, and then 0.5 g of acetylacetone was added to yield a white precipitate. The white precipitate was dissolved by adding 0.2 g of paraformaldehyde and heated at 70° C. for 10 minutes to give a uniform solution.

The solution obtained was applied to a quartz glass by dipping at a withdrawing speed of 10 cm/min and baked at 800° C. for one hour to give a red transparent thin film of strontium ferrite (SrO.6Fe$_2$O$_3$) of about 1000 Å in thickness. In addition, after removing the solvent from the solution the residue was calcined at 800° C. for one hour to give ultrafine particles of strontium ferrite having a primary particle size of 0.08 μm.

EXAMPLE 11

To 100 g of dry ethyl alcohol were 11.64 g of iron triisopropoxide and 3.88 g of zinc diethoxide so that the atomic the atomic ratio of Fe:Zn was 2:1 to yield a precipitate of zinc diethoxide.

Two grams of citraconic acid was added to this system with stirring, and then the mixture was refluxed to give a uniform solution.

After removing the solvent from the solution the residue was calcined at 600° C. for one hour to give a spinel ferrite powder of ZnFe$_2$O$_4$ having a particle size of 0.2 μm.

EXAMPLE 12

In 100 g of dry ethyl alcohol were dissolved 16.3 g of lead diisopropoxide, 7.12 g of titanium tetraisopropoxide and 9.60 g of zirconium tetrabutoxide (atomic ratio of Pb:Ti:Zr=2:1:1), and then 10 g of oleic acid was added. After heating and refluxing the mixture for 30 minutes a uniform solution was obtained. The solution was stable for one or more months. The residue prepared by removing the solvent from the solution was calcined at 800° C. for one hour to give a powder of Pb(Zr$_{0.5}$.Ti$_{0.5}$)O$_3$ having a particle size of 0.2 μm.

In addition, the solution was applied to a quartz glass plate by dipping at a withdrawing speed of 10 cm/min and was baked at 800° C. for one hour to give a transparent thin film of Pb(Zr$_{0.5}$.Ti$_{0.5}$)O$_3$ of 1000 Å in thickness.

COMPARATIVE EXAMPLE 7

In 100 g of dry ethyl alcohol were dissolved 5.17 g of barium diisopropoxide and 5.69 g of titanium tetraisopropoxide (molar ratio of Ba:Ti=1:1) in the same manner as in Example 9. The solution obtained was applied to a quartz glass plate by dipping at a withdrawing speed of 10 cm/min to form a cloudy and nonuniform thin film which had particles on its surface.

In addition, when the solution was sealed and allowed to stand for two days, a large amount of precipitate was formed, which shows lack of stability of the solution.

COMPARATIVE EXAMPLE 8

Dry ethyl alcohol solution of iron triisopropoxide and strontium diisopropoxide (atomic ratio of Fe:Sr=12:1) was prepared in the same manner as in Example 10. The solution was sealed and allowed to stand for two days to form a large amount of precipitate, which shows lack of stability of the solution.

EXAMPLES 13 TO 16

In 100 g of dry ethyl alcohol was dissolved 10.0 g of iron triisopropoxide, and then the metal acetylacetonate shown in Table 3 was added in an amount so as to give a spinel ferrite composition (Fe: other metal=2:1). The metal acetylacetonate was smoothly dissolved in the solution to give a uniform solution containing two metals.

The acetylacetone complexes of nickel, cobalt and zinc among the metal acetylacetonate shown in Table 3 were dissolved with heating since they are hardly soluble in ethyl alcohol.

The solution obtained was applied to glass plate made of Corning #7913 (Vycor glass (SiO$_2$ content 96%) available from Corning Glass Works) by dip coating at a withdrawing speed of 10 cm/min. The coated glass was heated in a muffle furnace by elevating a temperature to 800° C. at a rate of about 5° C./min and maintaining at 800° C. for one hour. After gradually cooling, a reddish brown transparent uniform thin film was formed on the glass. The thickness of the film was about 800 Å.

The film was determined in elementary ratio of Fe to the other metal by fluorescent X-ray method. The results are shown in Table 3.

In addition, since the film was so thin that the diffraction pattern measured by the X-ray method could not be made clear, the solution prepared in the above was dried and heated in the same manner as in the above to give a powder. The crystal structure of the powder was determined by X-ray diffraction method. The results are shown in Table 3.

TABLE 3

| Example | Metal acetylacetonate (grams on the basis of 10 g of iron triisoproxide) | Elementary ratio | Crystal structure determined by X-ray diffraction method |
|---|---|---|---|
| 13 | Ni(AA)$_2$ (5.52) | Fe:Ni = 2:0.88 | NiFe$_2$O$_4$ plus slight α-Fe$_2$O$_3$ |
| 14 | Zn(AA)$_2$ (5.66) | Fe:Zn = 2:0.87 | ZnFe$_2$O$_4$ plus slight α-Fe$_2$O$_3$ |
| 15 | Mn(AA)$_2$ (5.48) | Fe:Mn = 2:0.85 | MnFe$_2$O$_4$ plus slight α-Fe$_2$O$_3$ |
| 16 | Co(AA)$_2$ (5.52) | Fe:Co = 2:0.95 | CoFe$_2$O$_4$ |

EXAMPLE 17

In 100 g of dry ethyl alcohol was dissolved 10 g of iron triisopropoxide, and then 3.37 g of nickel bisacetylacetonate and 3.46 g of zinc bisacetylacetonate were added (elementary ratio of Fe:Ni:Zn=2:0.5:0.5). After adding 0.5 g of paraformaldehyde to the mixture and refluxing for 30 minutes, ethyl alcohol was removed from the solution, and then 100 g of tetrahydrofuran was added to give a uniform solution. The solution was stable for one or more months.

The solution was applied to Corning #7059 by dip coating in the same manner as in Example 13, and then heated in a muffle furnace by elevating a temperature to 600° C. at a rate of 5° C./min and maintaining at 600° C. for one hour. After gradually cooling, a yellowish brown transparent uniform thin film was obtained. As a result of elementary analysis of the film by fluorescent X-ray method, the elementary ratio of Fe:Ni:Zn was found to be 2:0.49:0.47. The result shows the fact that the desired spinel ferrite thin film of $(Ni_{0.5}.Zr_{0.5})Fe_2O_4$ was obtained.

EXAMPLE 18

In 100 g of an absolute ethyl alcohol was dissolved 15 g of iron triisopropoxide, and then 2.2 g of barium bisacetylacetonate was added (Fe:Ba=12:1). Since barium bisacetylacetonate was not dissolved with heating, 1 g of paraformaldehyde was added to the mixture and refluxed for 15 minutes. The white precipitate of barium bisacetylacetonate was dissolved to give a uniform solution. The solution was stable for one or more months by sealing.

The solution was applied to Vicor glass plate by dip coating at a withdrawing speed of 10 cm/min. The coated glass heated in a muffle furnace by elevating a temperature to 800° C. at a rate of 5° C./min and maintaining at 800° C. for one hour. After gradually cooling, a transparent ferromagnetic thin film of $BaO.6Fe_2O_3$ was obtained. The thickness of the film was about 1000 Å.

COMPARATIVE EXAMPLE 9

To 100 g of dry ethyl alcohol were added 25 g of iron trisacetylacetonate and 9.1 g of nickel bisacetylacetonate. The metal chelates were dissolved by heating and stirring to give a uniform solution. The solution was applied to Vicor glass by dip coating in the same manner as in Example 13. The coating had patched portions and was uneven. A uniform thin film of nickel ferrite could not be prepared by baking the coated glass.

COMPARATIVE EXAMPLE 10

In 100 g of an absolute ethyl alcohol were dissolved 25 g of iron triisopropoxide and 2.29 g of barium diisopropoxide (Fe:Ba=12:1). The solution obtained was applied to Vicor glass by dip coating and was baked in the same manner as in Example 17 to form a cloudy nonuniform thin film on the glass. Observation by a scanning type electron microscope showed that the film was not adhered to the surface of the glass and was constructed by particles.

In addition, when the solution was sealed and stored, a large amount of precipitate was formed after two days, which shows instability of the solution.

EXAMPLE 19

In 100 g of an absolute ethyl alcohol was dispersed 16.79 g of barium bisacetylacetonate and then 1 g of paraformaldehyde and 14.21 g of titanium tetraisopropoxide which contains titanium equivalent to barium in barium bisacetylacetonate were added. The mixture was refluxed for 5 minutes to give a reddish brown uniform solution. After displacing the solvent, i.e. ethyl alcohol with tetrahydrofran, the solution was sealed and stored. The solution was stable after one or more months.

The solution was applied to Vicor glass by dip coating in the same manner as in Example 13 and was baked at 800° C. to give a yellowish transparent thin film of 1200 Å in thickness.

By using electrospectroscopy for chemical analysis (ESCA), the elementary ratio of Ba:Ti:O to the depth of 1000 Å was found to be 1:1:3, which shows the fact that the film was a film of $BaTiO_3$.

COMPARATIVE EXAMPLE 11

In 100 g of dry ethyl alcohol were dissolved 12.8 g of barium diisopropoixide and 14.2 g of titanium tetraisopropoxide (Ba:Ti=1:1). The solution was applied to Vicor glass by dip coating in the same manner as in Example 19 to form an uneven thin film. The surface of the film was very cloudy.

After two days a large amount of brown precipitate was formed from the solution, which shows the fact that the solution was instable.

EXAMPLE 20

A solution for an electrically conductive transparent film was prepared by dissolving and refluxing 15 g of tin tetraisopropoxide and 0.7 g of antimony triisopropoxide and 0.5 g of acetylacetone and 0.2 g of paraformaldehyde in 100 g of dry ethyl alcohol. On the other hand, a solution for a barium titanate film was prepared by adding 8.4 g of barium bisacetylacetonate and 7.2 g of titanium tetraisopropoxide to 100 g of dry ethyl alcohol, heating and further adding 1 g of paraformaldehyde with stirring, and then changing the solvent, i.e. ethyl alcohol with tetrahydrofuran.

The solution for the electrically conductive film was applied to a quartz glass by dip coating at a withdrawing speed of 5 cm/min. The coated glass was heated by elevating a temperature to 600° C. at a rate of 10° C./min and baked at that temperature for one hour. After cooling, the solution for the barium titanate film was applied, baked in the same manner as in the above. The above treatments were repeated to give a transparent thin film having four layers.

As a result of analyzing the multilayer film by ESCA, the film was found to be constructed of the antimony-doped tin oxide layer and the barium titanate layer laminated one on the other. The thicknesses of the layers are about 500 Å. The multilayer film is available for a transparent layered capacitor.

EXAMPLE 21

A solution for a nickel ferrite film was prepared by dissolving 10 g of iron triethoxide and 6.72 g of nickel bisacetylacetonate in heated dry ethyl alcohol (Fe:Ni=2:1).

A solution for a barium ferrite film was prepared by adding 1 g of barium bisacetylacetonate and 6.82 g of iron triethoxide to 100 g of an absolute ethyl alcohol, heating and adding 0.5 g of paraformaldehyde with stirring.

The solution for the nickel ferrite film was applied to a quartz glass plate by dipping at a withdrawing speed of 10 cm/min and was baked by elevating the temperature to 800° C. at a rate of 10° C./min and maintaining at 800° C. for one hour. After cooling, the solution for the barium ferrite film was applied and heated to give a red semitransparent thin maltilayer film. As a result of analyzing the multilayer film, the film was found to be constructed of a barium ferrite layer ($BaO.6Fe_2O_3$) of about 1000 Å in thickness and a nickel ferrite layer ($NiFe_2O_4$) of about 800 Å in thickness.

EXAMPLE 22

In 100 g of ethyl acetate were dissolved 15 g of zinc octylate (zinc content 15.0% by weight) and 13.3 g of bismuth triisopropoxide (Zn:Bi=1:1). The solution obtained was applied to a quartz glass by dip coating at withdrawing speed of 10 cm/min. The coated glass was dried in an oven at 80° C. for 15 minutes, baked in a muffle furnace by elevating a temperature to 800° C. at a rate of 10° C./min and maintaining at 800° C. for one hour, and then cooled.

The thin film was transparent and had a thickness of about 1000 A. As a result of observing the film by a scanning type electron microscope, the film was found to be constructed of ZnO particles of about 0.1 μm in particle size uniformly distributed in a glassy bismuth oxide. Further, as a result of determining an atomic ratio of Zn/Bi by measuring the ratios in five areas of 10 square μm with a X-ray microanalyzer, the ratios of Zn/Bi were found to be within the range of 0.92 to 1.06. The results show the fact that the ZnO particles were very uniformly distributed. Such uniform distribution cannot be obtained by a conventional powder molding process.

EXAMPLE 23

A uniform solution was prepared by adding 1.5 g of barium bisacetylacetonate and 6.24 g of iron triisopropoxide (Ba:Fe=1:6) to 100 g of dry ethyl alcohol, and further adding 0.5 g of paraformaldehyde, and then heated and refluxed for 30 minutes.

A solution of an oligomer of silicon ethoxide was prepared by dissolving 10 g of tetramer of silicon tetraethoxide in 50 g of dry ethyl alcohol, and further adding 5 g of an ethyl alcohol solution containing 10% by weight of a 5% aqueous acetic acid solution with stirring.

After admixing 50 g of the first solution with 50 g of the second solution, the mixture was applied to a quartz glass by dip coating at a withdrawing speed of 10 cm/min. The coated glass was baked by elevating a temperature to 1000° C. at a rate of 10° C./min and maintaining at 1000° C. for two hours to give a reddish brown thin film of about 1200 A in thickness.

As a result of analyzing the film with a scanning type electron microscope and a X-ray microanalyzer, the film was found to be constructed of heaxagonal barium ferrite particles of about 0.3 μm in particle size uniformly dispersed in SiO$_2$ glass.

EXAMPLE 24

To 54.0 g of isopropyl acetate were added 23.3 g of iron triisopropoxide and 29.4 g of a methyl cellosolve solution of nickel linoleate containing 10% of nickel metal. The mixture was heated and refluxed at about 140° C. in a nitrogen atmosphere, and then cooled to give a uniform brown solution.

The solution obtained was applied to a quartz glass by dip coating at a rate of 15 cm/min and dried at 150° C. for one hour in air to give a hard film showing interference color.

The film was baked at 800° C. for one hour in a muffle furnace to give a brown transparent thin film. The film was so hard and dense that it could not be scratched by scrubbing with a wire brush of brass. In addition, as a result of analyzing the film by X-ray diffraction method, the film was found to be constructed of a uniform layer of nickel ferrite.

What we claim is:

1. A solution suitable for the preparation of inorganic composite materials by thermally decomposing the solution, said solution comprising:
   (a) at least one member selected from the group consisting of a metal alkoxide and an oligomer thereof,
   (b) at least one member selected from the group consisting of a metal chelate and a chelating agent, and
   (c) at least one aldehyde selected from the group consisting of formaldehyde, paraformaldehyde, acetaldehyde and benzaldehyde,
   wherein at least two different metals are present in the solution as components (a) and (b), and the amount of the aldehyde is at least 0.001 mole of aldehyde per 1 mole of the total amount of metals present as components (a) and (b).

2. The solution of claim 1, wherein the component(a) is at least one metal alkoxide and the component(b) is at least one metal chelate.

3. The solution of claim 2, wherein said metal chelate is a metal complex of a ketone having at least two carbonyl groups.

4. The solution of claim 1 wherein said metal chelate is a member selected from the group consisting of a metal complex of a carboxylic acid containing no nitrogen, a metal complex of a nitrogen containing carboxylic acid, a metal complex of a nitrogen containing alcohol, a metal complex of a nitrogen containing thiol, a metal complex of a ketone, a metal complex of an ester, and a metal complex of a mercaptan.

5. The solution of claim 1, wherein said metal chelate is a metal acetylacetonate.

6. The solution of claim 1, wherein the component(a) comprises at least two metal alkoxides and the component(b) comprises at least one chelating agent.

7. The solution of claim 6, wherein said chelating agent is a ketone having two or more carbonyl groups.

8. The solution of claim 1, wherein said chelating agent is a member selected from the group consisting of a carboxylic acid containing no nitrogen, a nitrogen containing carboxylic acid, a nitrogen containing alcohol, a nitrogen containing thiol, a ketone, an ester, and a mercaptan.

9. The solution of claim 1, wherein said chelating agent is acetylacetone.

10. The solution of claim 1, wherein the solution includes at least one organic solvent having 1 to 20 carbon atoms selected from the group consisting of a monohydric alcohol, a polyhydric alcohol, a carboxylic acid ester, an ether, a ketone, an aliphatic hydrocarbon, an aromatic hydrocarbon and a nitrogen-containing organic solvent.

11. The solution of claim 1, wherein said aldehyde is a member selected from the group consisting of formaldehyde and paraformaldehyde.

12. The solution of claim 1 wherein the amount of said aldehyde is at least 0.1 mole of aldehyde per mole of the total amount of metals.

13. The solution of claim 11 wherein the amount of said aldehyde is at least 0.1 mole of aldehyde per mole of the total amount of metals.

* * * * *